US006176288B1

(12) United States Patent
Kane et al.

(10) Patent No.: US 6,176,288 B1
(45) Date of Patent: Jan. 23, 2001

(54) PASSIVE ANGULAR ORIENTATION INFLATION HEAD FOR INFLATING A TIRE MOUNTED ON A WHEEL

(75) Inventors: John P. Kane, Sterling Heights; Karl D. Sachs, Birmingham, both of MI (US)

(73) Assignee: AIM Automotive Integrated Manufacturing, Inc., Sterling Heights, MI (US)

( * ) Notice: Under 35 U.S.C. 154(b), the term of this patent shall be extended for 0 days.

(21) Appl. No.: 09/253,600

(22) Filed: Feb. 22, 1999

Related U.S. Application Data

(60) Provisional application No. 60/093,671, filed on Jul. 22, 1998.

(51) Int. Cl.[7] ..................................................... B27H 7/00

(52) U.S. Cl. ............................................... 157/1; 157/1.24

(58) Field of Search ................................. 157/1, 1.1, 1.2, 157/1.11, 1.22, 1.24

(56) References Cited

U.S. PATENT DOCUMENTS

| | | |
|---|---|---|
| 3,461,938 | 8/1969 | Mueller . |
| 3,978,903 | 9/1976 | Mueller et al. . |
| 4,183,392 | 1/1980 | Kane . |
| 4,735,250 | 4/1988 | Kane . |
| 4,834,159 | 5/1989 | Burger . |
| 4,947,919 * | 8/1990 | Timlin ................................ 157/1.24 |
| 5,035,274 | 7/1991 | Kinnick et al. . |
| 5,170,828 * | 12/1992 | Curcuri .................................. 157/1 |
| 5,980,083 * | 11/1999 | Patte et al. ...................... 364/468.01 |

* cited by examiner

*Primary Examiner*—David A. Scherbel
*Assistant Examiner*—Hadi Shakeri
(74) *Attorney, Agent, or Firm*—Young & Basile, P.C.

(57) ABSTRACT

An apparatus and method for inflating a tire mounted on a wheel having first and second rims spaced apart from one another includes a reciprocal inflation head moveable along a fixed path between a first position spaced from the wheel and tire, and a second position in operable engagement with a sidewall of the tire. The inflation head has an annular sealing surface engageable with the sidewall of the tire to provide a sealed passage for introducing compressed fluid between the tire and the wheel for inflating the tire on the wheel. A floating connection allows passive angular orientation of the inflation head with respect to the sidewall of the tire as the head moves between the first and second positions to achieve sufficient contact between the sealing surface of the head and the sidewall of the tire for creating the sealed passage and for maintaining sufficient contact during inflation of the tire on the wheel to maintain the sealed passage. A reorientation member resets the head to a neutral angular orientation with respect to the fixed path of travel of the head between the first and second positions as the head returns to the first position from the second position.

23 Claims, 3 Drawing Sheets

PASSIVE ANGULAR ORIENTATION INFLATION HEAD FOR INFLATING A TIRE MOUNTED ON A WHEEL

RELATED APPLICATIONS

The present application is a continuation of U.S. Provisional Application Serial No. 60/093,671, filed on Jul. 22, 1998.

FIELD OF THE INVENTION

The present invention relates to an inflating station where a tire mounted on a wheel is engaged by an inflation head in order to inflate the tire on the wheel at a wheel inflation station.

BACKGROUND OF THE INVENTION

The mounting of tubeless tires on wheels by automobile manufacturers is normally accomplished by a high production apparatus where a wheel is placed on a conveyer, a tire is preliminarily positioned relative to the wheel, and as the wheel and tire are conveyed from station to station, the tire is soaped, the tire is forced over the wheel rim and mounted intermediate to the wheel rims, the wheel and tire can be rotated relative to each other in accordance with previously applied reference points, and the tire is inflated to a predetermined pressure.

To reduce the duration of time required for inflation it is a common practice to impose an annular axial force on one of the tire sidewalls which causes the other tire sidewall bead to seat against the associated wheel rim while the deflected sidewall bead is displaced from its associated wheel rim. Consequently, an inflation chamber is defined by the engaging apparatus and compressed air is forced into the tire around the displaced sidewall bead, and after the desired pressurizing is accomplished the deflected tire sidewall is permitted to expand to seat its bead against the wheel rim to maintain the inflation pressure, and such inflation can be readily accomplished in a very short time.

With higher production tire inflation devices of this type, an annular inflation chamber is defined which includes the interior of the tire wherein pressurization of the chamber produces the desired pressure within the tire. To define the inflation chamber, an annular wheel seal is usually employed which engages the wheel rim. Further, an annular tire sidewall seal is normally employed which engages the tire sidewall for displacing the sidewall, and also defining the pressurized chamber. The sidewall engaging seal and the wheel rim engaging apparatus are displaceable with respect to each other to produce the desired sequence of operation. No sealing apparatus is associated with the opposite side of the tire, since the seal is achieved by engagement of the tire bead with the wheel rim. Examples of the described tire inflation apparatus can be seen in U.S. Pat. No. 4,183,392 and U.S. Pat. No. 4,735,250.

There are several disadvantages inherent in high production tire inflation devices of the type described above. One serious problem occurs at the interface between the sidewall of the tire carcass and the annular tire sidewall seal when the tire carcass is deformed in a non-uniform manner. In order for an effective seal to occur between the displaced tire sidewall of the carcass and the associated annular tire sidewall seal engaging the carcass, the annular inflation chamber structure must be lowered sufficiently to sealingly engage the annular tire sidewall seal with the lowest level of the distorted tire carcass sidewall. In the past, the annular inflation chamber, or inflation head, was held in a fixed orientation as it was moved with respect to the tire sidewall for sealing engagement therewith. In addition, structural limitations were present in limiting the extent to which the annular tire sidewall seal could move relative to the position of the annular wheel seal engagement with the wheel rim in order to define the inflation chamber. In instances where excessive distortion of the tire carcass was present, an insufficient seal was provided between the annular tire sidewall seal due to incomplete or non-sealing engagement with the tire sidewall. Excessively distorted tire carcasses passing through the production line undesirably impacts the high production tire inflation apparatus, leading to unproductive down time or defective, non-inflated tire carcass and wheel combinations. The tire carcass distortion can be due to deformation arising from tire banding, temperature, design, or other reasons, such as an excessive gap or clearance that may exist between the uninflated tire sidewall bead and the rim which defies closing even when the fixed orientation inflation head is moved to the furthest extent of movement of the annular tire sidewall seal in previously known devices. When an ineffective seal is created, pressurization of the inflation apparatus causes considerable air to be lost because of the misfit between the tire sidewall and the associated annular sidewall seal. Consequently, high noise levels can be created due to the escape of large quantities of high pressure air, and if a seal cannot be established with the tire, the tire will not inflate and must be recycled or remounted to produce the required seal necessary for inflation.

SUMMARY OF THE INVENTION

It is desirable in the present invention to provide a high production tire inflation apparatus which is capable of accommodating a wide variety of wheel and tire sizes without modifying the inflation apparatus. In addition, it is desirable to provide a tire inflation apparatus capable of rapidly inflating a tubeless tire using a floating head capable of adapting to a distorted tire carcass sidewall sufficiently to provide a seal to define the inflation chamber required in order to inflate the tire on the wheel. The present invention relates to an apparatus for inflating a tire mounted on a wheel between the spaced apart rims. The apparatus includes a floating head for inflating the tire, where the head is attached to a reciprocal frame member through a floating connection or mount allowing passive movement of the head as required to sealingly engage the sidewall of the tire in order to obtain a seal for inflating the tire. The floating connection or mount can include a ball and socket configuration, and/or a swivel connection, for mounting the floating head to the reciprocal frame. The reciprocal frame can move the floating head between a first position spaced from the tire and wheel combination, and a second position operably engaging the annular tire sidewall seal with the tire sidewall for inflation. When in the retracted or first position, the floating head engages angularly spaced stops or reorientation members to reset or return the head to a "neutral", non-angled orientation generally perpendicular with respect to the fixed path of movement between the first and second positions.

It is desirable in the present invention to provide a high production tire inflation apparatus, where the wheel and tire to be inflated can be mounted on a conveyer pallet for movement into an operable position with respect to the floating inflation head. In practice, tires to be inflated are mounted on conveyer pallets and the tires are indexed between various stations at which the mounting and inflation sequences occur. When the tire and wheel arrive at the inflation apparatus according to the present invention, the tire is located between the wheel rims, and the tire is supported on a pallet having a vertical axis. The pallet can include a circular peripheral edge which engages the lower tire sidewall to form a seal during inflation. In the alternative, other sealing configurations can be used as are known to those skilled in the art, such as by driving the lower bead into engagement with the wheel rim in order to form an effective seal. The inflation apparatus, according to the present invention includes a frame and a carriage vertically positionable between the first position and the second position by motor means, preferably in the form of an expandable chamber defined by at least one cylinder and piston combination. Appropriate controls or valves are provided with the motor means to permit sequential operation thereof. By way of example and not limitation, an air motor can be used to rapidly lower or raise the carriage of the inflation apparatus, while a hydraulic motor can be employed to lock the carriage to resist forces imposed on the carriage by the compressed air during inflation of the tire on the wheel.

The carriage, according to the present invention, includes an annular tire seal inflation ring head which is lowered into engagement with the upper tire sidewall by the motor means. In response to initial engagement with the tire sidewall, the floating head will passively pivot from a generally planar horizontal orientation with respect to the fixed path of travel of the head to an angularly orientated non-horizontal orientation, if required, in order to fully engage the annular tire seal around the entire periphery of the tire sidewall. A predetermined degree of additional movement of the head toward the base is provided in order to deflect the upper tire sidewall downwardly to produce a clearance between the upper sidewall bead and the upper wheel rim. Such downward pressure in combination with the passive floating action of the inflation head acts on the tire to firmly force the lower tire sidewall into engagement with a sealing edge defined on the conveyor pallet, or alternatively can cause the lower tire bead to firmly engage with the lower wheel rim in order to define the inflation chamber. A compressed air inlet located in the seal ring now permits compressed air to be rapidly introduced into the inflation chamber which quickly produces the desired inflation pressure therein. The upward force imposed on the seal, ring and carriage by the air pressure within the inflated chamber is resisted by the motor means. After the inflation pressure has been reached, the introduction of compressed air into the inflation chamber terminates, and under the control of the motor means, the carriage and seal ring are raised sufficiently to permit the upper tire sidewall bead to seat against the upper wheel rim, trapping air within the tire at the desired inflation pressure. The floating head configuration permits the annular tire seal to passively move angularly with respect to the fixed path of movement of the head as the tire inflates and depending on the condition of the tire can be passively returned to the neutral or start orientation after completion of the inflation sequence by engagement with stops or reorientation members adjacent the first position. Even if the floating head is not returned to the neutral position generally perpendicular to the fixed path of travel between the first and second positions of the carriage during the inflation sequence, resetting means are provided adjacent the first position for resetting the floating head to a neutral position with respect to the path of travel. Preferably by way of example and not limitation, the neutral position is defined as being generally in a horizontal orientation with respect to the fixed path of travel between the first and second positions of the carriage in the configuration as illustrated in FIG. 1. The motor means quickly raises the carriage and seal ring from the tire, readying the apparatus for the next inflation cycle, and the conveyer is indexed so that the cycle can be repeated.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
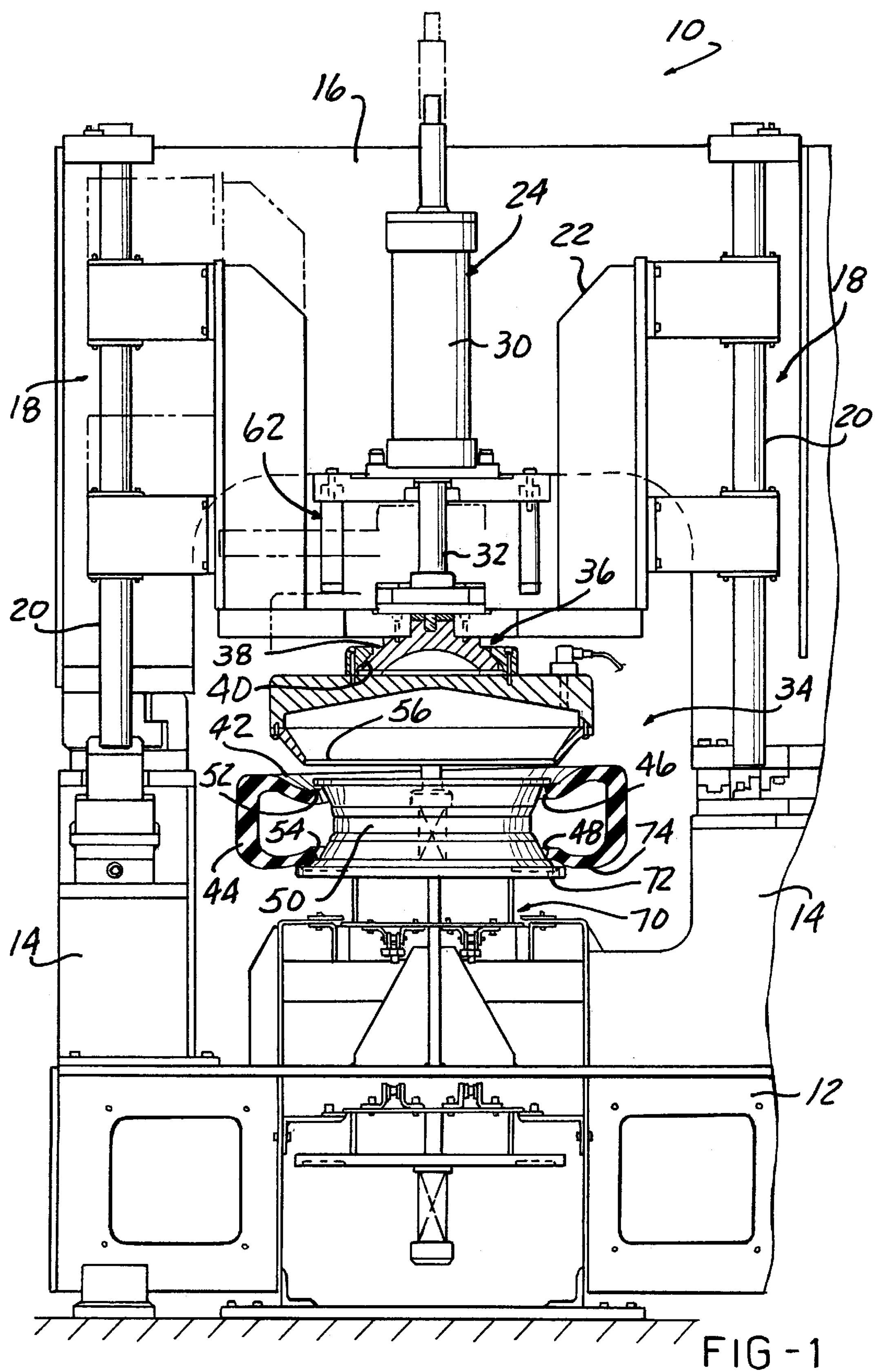
FIG. 1 is an elevational view, partially sectioned, of a tire inflation apparatus according to the present invention, with the inflation head being shown in phantom in a raised position or first position and in solid line in a position between the first position and a second position.
Figure 2:
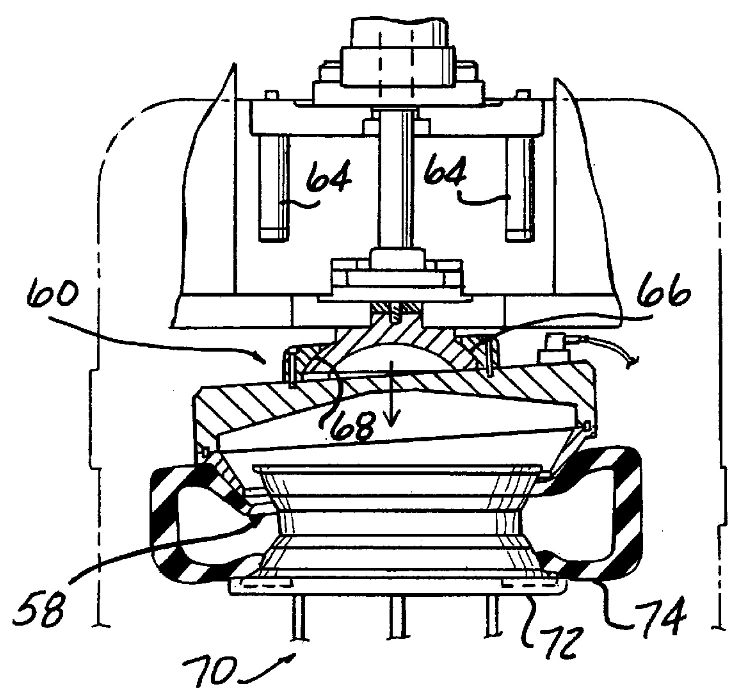
FIG. 2 is a detailed, enlarged, elevational view, partially sectioned, illustrating the relationship of the tire and the inflation head after displacement of the upper tire sidewall during inflation by the floating head according to the present invention.

With reference to FIGS. 1–5, the tire inflation apparatus according the present invention includes a frame 10 having a base 12 into which conveyer structure can be incorporated, and frame columns 14 vertically extending from the base and are connected to one another by bridge portion 16. Carriage guides 20 slidably engage with vertical ways 18 supported within each of the columns 14. The guides 20 support the carriage 22 for vertical movement between a first position spaced from the base 12 and a second position in closer proximity to the base 12 in order to engage the sidewall of a tire positioned at the work station. The carriage is vertically displaced between the several positions by a motor unit or assembly 24. The motor assembly 24 is mounted on the bridge 16 and can include a fluid operated actuator 30. A piston rod 32 extends through the fluid operated actuator 30 and extends from the lower region of the motor assembly 24 for connection to the carriage 22. The controls for the motor assembly 24 are not illustrated, since these are conventional and considered to be within the knowledge of those skilled in the art.

The carriage 22 supports the floating head 34 for movement between the first position and the second position. Means 36 is provided for connecting the floating head 34 to the carriage 22 allowing for limited, passive, angular orientation of the floating head 34 with respect to an elongated axis extending along the path of movement between the first and second positions. The connecting means 36 preferably includes at least a partial ball and socket configuration and/or a swivel configuration allowing limited angular movement of the floating head 34 with respect to the carriage 22 within a predetermined range of motion. The connecting means 36 is sufficiently mobile to permit passive orientation of the floating head 34 with respect to the carcass of the tire as the floating head 34 moves between the first and second positions. The connecting means 36 according to the present invention preferably includes a partial spherical convex surface 38 and a complementary partial spherical concave surface 40 in mating engagement with one another. The convex surface 38 is connected to one of the carriage 22 and the floating head 34, while the convex surface 38 is connected to the other of the carriage 22 and floating head 34. As the floating inflation head 34 is moved from the first position spaced from the wheel and tire toward the second position, the head 34 comes into operable engagement with a sidewall 42 of the tire 44. The tire 44 includes annular beads 46, 48 spaced apart from one another and mounted on a wheel 50 having first and second rims 52, 54 spaced apart from one another for seating with respect to the respective beads 46, 48. The floating inflation head 34 has an annular sealing surface 56 engageable with the sidewall 42 of the tire 44 to provide a sealed passage 58 for introducing compressed fluid between the tire 44 and wheel 50 for inflating the tire 44 on the wheel 50. A floating connection 60 allows passive angular orientation of the head 34 with respect to the sidewall 42 of the tire 44 as the head 34 moves between the first position illustrated in FIG. 3 toward the second position illustrated in FIG. 2. As the head 34 approaches the second position, the head 34 reorientates with respect to the sidewall 42 of the tire 44 through passive angular movement about the floating connection 60 to achieve sufficient contact between the sealing surface 58 of the head 34 and the sidewall 42 of the tire 44 for creating the sealed passage 56. In addition, the floating connection 60 maintains sufficient contact during inflation of the tire 44 on the wheel 50 to maintain the sealed passage 58 during the inflation procedure. The passive angular orientation of the head 34 allows the present invention to accommodate a non-horizontal and/or non-planar sidewall 42 of a tire 44. The present apparatus can even adapt to provide a sealed passage 58 if the sidewall 42 is contorted below the maximum reciprocal end limit of movement of the floating head 34 by passive angular orientation of the head 34 to adapt to the sidewall 42 orientation. The ability to provide passive angular orientation of the head 34 increases overall productivity of the tire inflating apparatus, by reducing down time for the apparatus due to non-inflated tire and wheel combinations.

Figure 3:
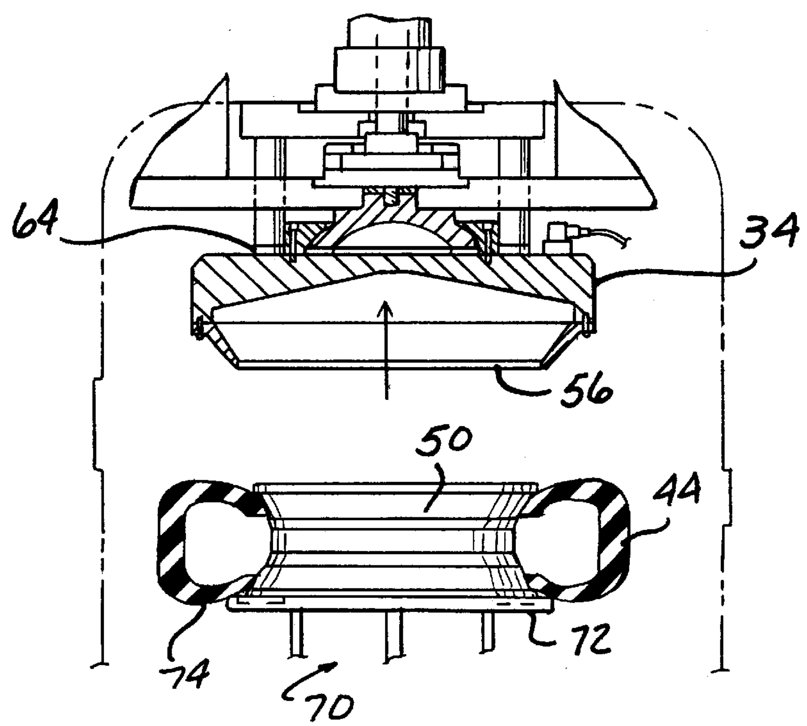
FIG. 3 is an elevational view similar to FIG. 2 illustrating the floating inflation head raised to the first position where retraction of the head to the raised position or first position passively reorientates the head to a neutral position generally perpendicular to a fixed path of travel between the first and second positions.

If the head 34 remains in an angled orientation with respect to the fixed path of travel after inflation of the tire 44 on the wheel 50, the head 34 is automatically reorientated or reset to a neutral angular orientation as best seen in FIG. 3. Reorientation means 62 is provided for resetting the head 34 to a neutral angular orientation with respect to the fixed path of travel of the head 34. The reorientation means 62 can include at least one reorientation stop 64 adjacent to the first position for engaging the head 34 as the head 34 approaches the first position. The reorientation stop 64 returns the head 34 to a neutral position with respect to the fixed path of travel. In the preferred configuration, the neutral position is generally perpendicular with respect to the fixed path as illustrated in FIG. 3. Preferably, the reorientation means 62 includes a plurality of reorientation stops 64 spaced angularly about the fixed path at equal angular positions with respect to one another for engaging the head 34 as the head approaches the first position.

The floating connection 60 can alternatively include at least partial spherical ball and complementary socket surfaces 66 and 68 in mating contact with one another for supporting the head 34 while allowing passive pivoting movement with at least two degrees of freedom. Preferably, the floating connection 60 allows movement with respect to two axis disposed perpendicular to one another, where both axis are perpendicular to the path of travel of the head 34. The ball and socket surfaces 66, 68 can also allow a third degree of freedom of movement corresponding to passive rotational movement of the head 34 about the axis of the fixed path.

In operation, the present invention includes a method for inflating a tire 44 mounted on a wheel 50 having first and second rims 52, 54 spaced apart from one another. The tire 44 and wheel 50 are initially disposed at a predetermined position with respect to one another. The method according to the present invention includes the steps of moving reciprocal inflation head means 34 along a fixed path between a first position spaced from the wheel 50 and tire 44, and a second position in operable engagement with a sidewall 42 of the tire 44. The head means 34 has an annular sealing surface 56 engageable with the sidewall 42 of the tire 44 to provide a sealed passage 58 for introducing compressed fluid between the tire 44 and the wheel 50 for inflating the tire 44 on the wheel 50. The method according to the present invention also includes the step of allowing passive angular orientation of the head means 34 with respect to the sidewall 42 of the tire 44 with floating connection means 60 as the head means 34 moves between the first and second positions to achieve sufficient contact between the sealing surface 56 of the head means 34 and the sidewall 42 of the tire 44 for creating the sealed passage 58 and for maintaining sufficient contact during inflation of the tire 44 on the wheel 50 to maintain the sealed passage 58. Further, the method according to the present invention includes the step of resetting the head means 34 to a neutral angular orientation with respect to the fixed path of travel of the head means 34 between the first and second positions with reorientation means 62, as the head means 34 returns to the first position from the second position.

In an automated tire inflation conveyor line environment, the present invention can be combined with an indexable step conveyor 70. The conveyor 70 can be operated to position a pallet 72 coaxial with the inflation head 34, and conventional conveyor positioning controls (not shown) are provided to stop the conveyor when a pallet is aligned with the floating inflation head 34. With the pallet operably positioned with respect to the inflation head 34, the wheel 50 and mounted tire 44 are substantially coaxial with the floating head 34. The motor unit 24 is actuated to drive the carriage 22 along the carriage guides 20 bringing the floating head 34 into engagement with the sidewall 42 of the tire 44. As the annular sealing surface 56 of the floating head 34 engages the sidewall 42, the floating head 34 passively pivots with respect to the floating connection 60 to an appropriate angular orientation in order to engage and seal with respect to the sidewall 42 of the tire 44 creating the sealed passage 58 for inflation of the tire 44 on the wheel 50. Pressurized fluid, such as compressed air, is introduced into the sealed passage 58 in order to inflate the tire 44 on the wheel 50. During inflation, the floating head 34 passively orientates the floating head 34 in an appropriate angular orientation by moving with respect to floating connection 60 in order to maintain the sealed passage 58.

After completion of the inflation of tire 44 on wheel 50, the motor unit 24 is activated to move the floating head 34 from the second position toward the first position. If the floating head 34 is not in a neutral position with respect to the fixed path of travel, the floating head engages reorientation means 62 such as one or more stops 64, for returning the floating head 34 to a neutral position when the head reaches the first position. The neutral position or orientation of the floating head 34 preferably corresponds to a perpendicular orientation with respect to the fixed path of travel of the floating head 34 between the first and second positions. When the floating head 34 has returned to the first position in a neutral orientation, the indexable step conveyor 70 can be actuated to remove the inflated tire 44 and wheel 50 from the workstation and to position a deflated tire 44 and wheel 50 at the workstation for a repetition of the sequential steps described above.

As is conventional, the indexable step conveyor 70 can include a pallet plate 72 for engagement with a lower sidewall 74 of the tire 44 and to support the lower surface of the wheel 50. The pallet plates 72 can include vertically extending positioning pins for engagement with the wheel 50 to position the wheel 50 in a predetermined position with respect to the pallet plate 72. An appropriate locating member can be provided to perform this function as is conventional in the art.

The floating connection 60 according to the present invention allows the floating head 34 to passively adapt to the position and orientation of the sidewall 42 of tire 44, even if the sidewall is in what would normally be considered to be an "abnormal" position. By way of example and not limitation, an "abnormal" position can occur if the tire has "collapsed" or has a lower vertical dimension than usual due to being crushed during shipping. The normal operation of the inflation apparatus according to the present invention automatically adapts by passively orienting the floating head 34 as required to the contour of the tire in order to provide a sealed passage 58.

Figure 4:
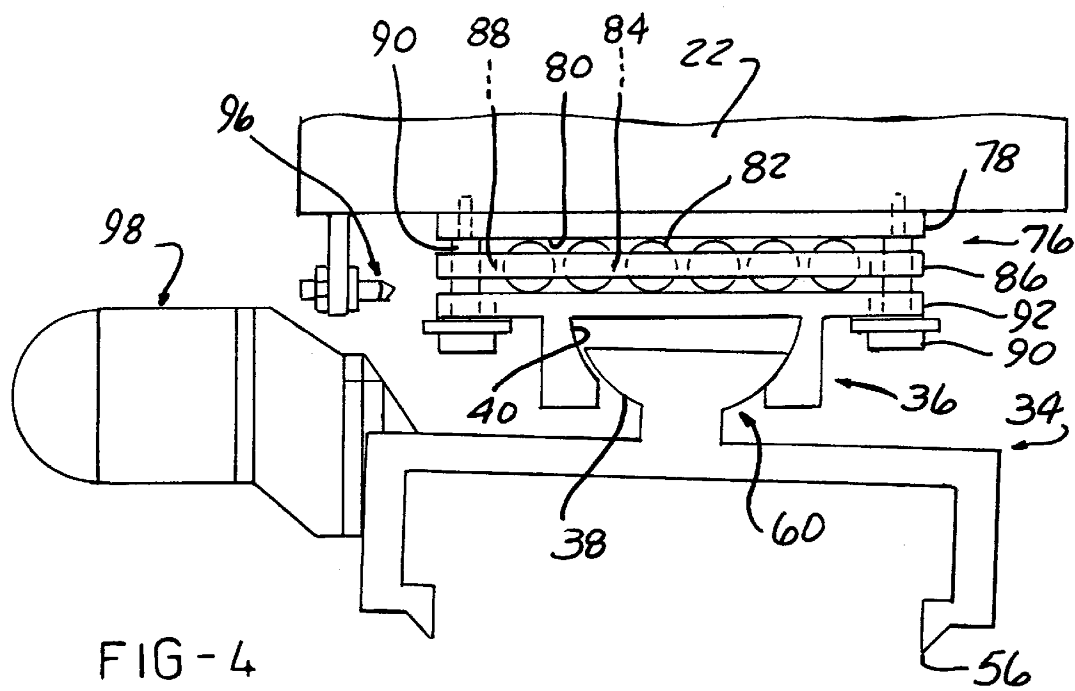
FIG. 4 is a simplified schematic view of a preferred configuration of the present invention including the floating inflation head moveable in a plane transverse or normal to the fixed path of travel between the first and second positions.
Figure 5:
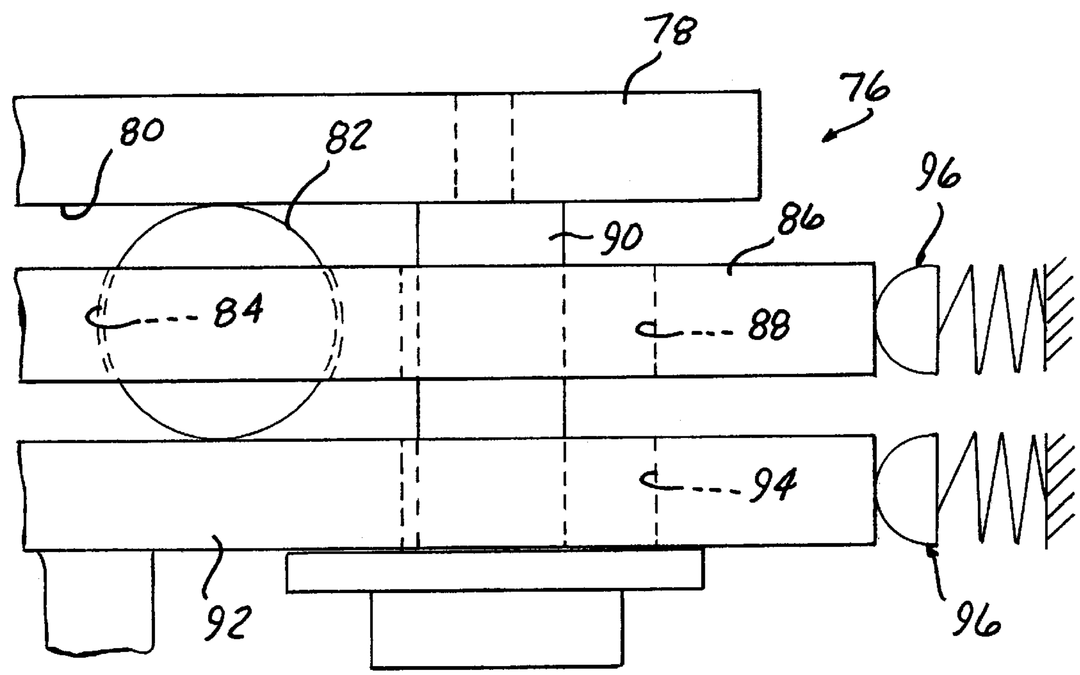
FIG. 5 is a detailed, enlarged, schematic view of the transversely shifting structure of the floating inflation head.

Referring now to FIGS. 4 and 5, the present invention preferably includes the addition of means 76 for transverse movement (not shown in FIGS. 1–3) with respect to the fixed path of travel between the first and second positions of the carriage 22 and supported floating head 34. A plate 78 is connected to the carriage 22 and preferably includes a hardened surface 80. A plurality of ball bearings 82 rollingly engage the surface 80 of plate 78. The ball bearings 82 are held in position within corresponding apertures 84 formed in a ball bearing cage plate 86. The cage plate 86 includes enlarged apertures 88 allowing passage of retaining fasteners 90 therethrough while allowing lateral movement of approximately plus or minus one-quarter inch (±¼") in any direction. A support plate 92 is provided for supporting the floating head 34 from the carriage 22. The support plate 92 engages the plurality of ball bearings 82 opposite from the surface 80 of plate 78. The support plate 92 supports the connecting means 36 defined by the partial spherical surfaces 38, 40 allowing floating movement of the inflator bell or floating head 34 presenting the annular sealing surface 56 for engagement with the sidewall of a tire to be inflated. The transverse movement means 76 defines a thrust bearing for lateral movement of the inflator bell or floating head 34 with respect to the fixed path of travel between the first and second positions of the carriage 22 and floating head 34. The supporting plate 92 includes oversized apertures 94 permitting approximately plus or minus one-quarter inch (±¼") movement in any direction. The retaining fasteners 90 extend through the oversized apertures 94 of support plate 92 and through the enlarged apertures 88 of the cage plate 86. The retaining fasteners 90 are anchored into the carriage 22. Biasing means 96 is provided for urging the support plate 92 and the cage plate 86 to a centered position with respect to the fixed path of travel between the first and second positions. The biasing means can include a plurality of spring biased rod plungers disposed in spaced peripheral orientation angularly about the outer periphery of the support plate 92 and the cage plate 86 for urging the support plate 92 and the cage plate 86 to return to a centered position after inflation of the tire on the wheel is completed as the carriage 22 moves from the lower position to the raised position.

In the preferred configuration illustrated in FIG. 4, means 98 is provided for vibrating the floating head 34 with respect to the tire 44. The vibrating means 98 can include an air-powered bulk material handling bin vibrator of the type commercially available and known to those skilled in the art. The air-powered vibrator causes the inflator bell or floating head 34 to vibrate and move with respect to the tire 44 to assist the annular beads 46, 48 of the tire 44 into full seating engagement with the respective rims 52, 54 of the wheel during the inflation process. It should be understood that other types of vibration generating devices known to those skilled in the art could be used in conjunction with the present invention without departing from the spirit or scope of the invention as defined in the following claims.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for inflating a tire mounted on a wheel having first and second rims spaced apart from one another, the tire and wheel disposed at a predetermined position, the apparatus comprising:

reciprocal inflation head means moveable along a fixed path between a first position spaced from the wheel and tire to be inflated, and a second position in operable engagement with a sidewall of the tire to be inflated, the head means having an annular sealing surface engageable with the sidewall of the tire to be inflated to provide a sealed passage for introducing compressed fluid between the tire and the wheel for inflating the tire on the wheel;

floating connection means for allowing passive angular orientation of the head means with respect to the sidewall of the tire to be inflated as the head means moves between the first and second positions to achieve sufficient contact between the sealing surface of the head means and the sidewall of the tire to be inflated for creating the sealed passage and for maintaining sufficient contact during inflation of the tire on the wheel to maintain the sealed passage; and reorientation means for resetting the head means to a neutral angular orientation with respect to the fixed path of travel of the head means between the first and second positions as the head means returns to the first position from the second position.

2. The apparatus of claim 1 wherein the head means further comprises:

at least one guide member extending between the first and second positions;

a carriage moveable along the guide member between the first and second positions, the carriage supporting the inflation head means;

a drive motor for imparting reciprocal movement to the carriage.

3. An apparatus for inflating a tire mounted on a wheel having first and second rims spaced apart from one another, the tire and wheel disposed at a predetermined position, the apparatus comprising:

reciprocal inflation head means moveable along a fixed path between a first position spaced from the wheel and tire to be inflated, and a second position in operable engagement with a sidewall of the tire to be inflated, the head means having an annular sealing surface engageable with the sidewall of the tire to be inflated to provide a sealed passage for introducing compressed fluid between the tire and the wheel for inflating the tire on the wheel;

floating connection means for allowing passive angular orientation of the head means with respect to the sidewall of the tire to be inflated as the head means moves between the first and second positions to achieve sufficient contact between the sealing surface of the head means and the sidewall of the tire to be inflated for creating the sealed passage and for maintaining sufficient contact during inflation of the tire on the wheel to maintain the sealed passage, wherein the connection means includes a convex surface and a complementary concave surface in mating contact with one another for supporting the head means while allowing passive pivoting movement in at least first and second directions; and reorientation means for resetting the head means to a neutral angular orientation with respect to the fixed path of travel of the head means between the first and second positions as the head means returns to the first position from the second position.

4. The apparatus of claim 3, wherein the connection means further comprises:

the convex and concave surfaces further allowing passive rotational movement of the head about the fixed path.

5. An apparatus for inflating a tire mounted on a wheel having first and second rims spaced apart from one another, the tire and wheel disposed at a predetermined position, the apparatus comprising:

reciprocal inflation head means moveable along a fixed path between a first position spaced from the wheel and tire to be inflated, and a second position in operable engagement with a sidewall of the tire to be inflated, the head means having an annular sealing surface engageable with the sidewall of the tire to be inflated to provide a sealed passage for introducing compressed fluid between the tire and the wheel for inflating the tire on the wheel;

floating connection means for allowing passive angular orientation of the head means with respect to the sidewall of the tire to be inflated as the head means moves between the first and second positions to achieve sufficient contact between the sealing surface of the head means and the sidewall of the tire to be inflated for creating the sealed passage and for maintaining sufficient contact during inflation of the tire on the wheel to maintain the sealed passage, wherein the connection means includes at least partial spherical complementary ball and socket surfaces in mating contact with one another for supporting the head means while allowing passive pivoting movement with at least two degrees of freedom; and reorientation means for resetting the head means to a neutral angular orientation with respect to the fixed path of travel of the head means between the first and second positions as the head means returns to the first position from the second position.

6. The apparatus of claim 5, wherein the connection means further comprises:

the ball and socket surfaces further allowing a third degree of freedom of movement corresponding to passive rotational movement of the head means about the fixed path.

7. An apparatus for inflating a tire mounted on a wheel having first and second rims spaced apart from one another, the tire and wheel disposed at a predetermined position, the apparatus comprising:

reciprocal inflation head means moveable along a fixed path between a first position spaced from the wheel and tire to be inflated, and a second position in operable engagement with a sidewall of the tire to be inflated, the head means having an annular sealing surface engageable with the sidewall of the tire to be inflated to provide a sealed passage for introducing compressed fluid between the tire and the wheel for inflating the tire on the wheel;

floating connection means for allowing passive angular orientation of the head means with respect to the sidewall of the tire to be inflated as the head means moves between the first and second positions to achieve sufficient contact between the sealing surface of the head means and the sidewall of the tire to be inflated for creating the sealed passage and for maintaining sufficient contact during inflation of the tire on the wheel to maintain the sealed passage; and reorientation means for resetting the head means to a neutral angular orientation with respect to the fixed path of travel of the head means between the first and second positions as the head means returns to the first position from the second position, wherein the reorientation means includes at least one reorientation stop adjacent the first position for engaging the head means as the head means approaches the first position for returning the head means to a neutral position with respect to the fixed path.

8. The apparatus of claim 7 wherein the reorientation means further comprises:

the neutral position generally perpendicular with respect to the fixed path.

9. An apparatus for inflating a tire mounted on a wheel having first and second rims spaced apart from one another, the tire and wheel disposed at a predetermined position, the apparatus comprising:

reciprocal inflation head means moveable along a fixed path between a first position spaced from the wheel and tire to be inflated, and a second position in operable engagement with a sidewall of the tire to be inflated, the head means having an annular sealing surface engageable with the sidewall of the tire to be inflated to provide a sealed passage for introducing compressed fluid between the tire and the wheel for inflating the tire on the wheel;

floating connection means for allowing passive angular orientation of the head means with respect to the sidewall of the tire to be inflated as the head means moves between the first and second positions to achieve sufficient contact between the sealing surface of the head means and the sidewall of the tire to be inflated for creating the sealed passage and for maintaining sufficient contact during inflation of the tire on the wheel to maintain the sealed passage; and reorientation means for resetting the head means to a neutral angular orientation with respect to the fixed path of travel of the head means between the first and second positions as the head means returns to the first position from the second position, wherein the reorientation means includes a plurality of reorientation stops spaced angularly about the fixed path at equal angular positions with respect to one another for engaging the head means as the head means approaches the first position.

10. An apparatus for inflating a tire mounted on a wheel having first and second rims spaced apart from one another, the tire and wheel disposed at a predetermined position, the apparatus comprising:

reciprocal inflation head means moveable along a fixed path between a first position spaced from the wheel and tire to be inflated, and a second position in operable engagement with a sidewall of the tire to be inflated, the head means having an annular sealing surface engageable with the sidewall of the tire to be inflated to provide a sealed passage for introducing compressed fluid between the tire and the wheel for inflating the tire on the wheel;

floating connection means for allowing passive angular orientation of the head means with respect to the sidewall of the tire to be inflated as the head means moves between the first and second positions to achieve sufficient contact between the sealing surface of the head means and the sidewall of the tire to be inflated for creating the sealed passage and for maintaining sufficient contact during inflation of the tire on the wheel to maintain the sealed passage, wherein said floating connection means includes transverse movement means for passively permitting movement of the head means transversely with respect to the fixed path of travel; and reorientation means for resetting the head means to a neutral angular orientation with respect to the fixed path of travel of the head means between the first and second positions as the head means returns to the first position from the second position.

11. The apparatus of claim 10 further comprising:

means for biasing the transverse movement means toward a centered position with respect to the fixed path of travel.

12. An apparatus for inflating a tire mounted on a wheel having first and second rims spaced apart from one another, the tire and wheel disposed at a predetermined position, the apparatus comprising:

reciprocal inflation head means moveable along a fixed path between a first position spaced from the wheel and tire to be inflated, and a second position in operable engagement with a sidewall of the tire to be inflated, the head means having an annular sealing surface engageable with the sidewall of the tire to be inflated to provide a sealed passage for introducing compressed fluid between the tire and the wheel for inflating the tire on the wheel;

floating connection means for allowing passive angular orientation of the head means with respect to the sidewall of the tire to be inflated as the head means moves between the first and second positions to achieve sufficient contact between the sealing surface of the head means and the sidewall of the tire to be inflated for creating the sealed passage and for maintaining sufficient contact during inflation of the tire on the wheel to maintain the sealed passage;

reorientation means for resetting the head means to a neutral angular orientation with respect to the fixed path of travel of the head means between the first and second positions as the head means returns to the first position from the second position; and vibration means for vibrating the head means with respect to the tire to be inflated.

13. An apparatus for inflating a tire mounted on a wheel having first and second rims spaced from one another, the tire and wheel disposed at a predetermined position, the apparatus comprising:

a reciprocal inflation head moveable along a fixed path between a first position spaced from the wheel and tire, and a second position in operable engagement with a sidewall of the tire, the head having an annular sealing surface engageable with the sidewall of the tire to provide a sealed passage for introduction of compressed fluid between the tire and the wheel to inflate the tire on the wheel;

a floating connection allowing passive angular orientation of the head with respect to the sidewall of the tire as the head moves between the first and second positions to achieve sufficient contact between the sealing surface of the head and the sidewall of the tire for creation of the sealed passage and for maintaining sufficient contact during inflation of the tire on the wheel to maintain the sealed passage; and at least one reorientation member for resetting the head to a neutral angular orientation with respect to the fixed path of travel of the head between the first and second positions as the head returns to the first position from the second position.

14. The apparatus of claim 13 further comprising:

at least one guide member extending between the first and second positions;

a carriage moveable along the guide member between the first and second positions, the carriage supporting the inflation head;

a drive motor for imparting reciprocal movement to the carriage.

15. An apparatus for inflating a tire mounted on a wheel having first and second rims spaced from one another, the tire and wheel disposed at a predetermined position, the apparatus comprising:

a reciprocal inflation head moveable along a fixed path between a first position spaced from the wheel and tire, and a second position in operable engagement with a sidewall of the tire, the head having an annular sealing surface engageable with the sidewall of the tire to provide a sealed passage for introduction of compressed fluid between the tire and the wheel to inflate the tire on the wheel;

a floating connection allowing passive angular orientation of the head with respect to the sidewall of the tire as the head moves between the first and second positions to achieve sufficient contact between the sealing surface of the head and the sidewall of the tire for creation of the sealed passage and for maintaining sufficient contact during inflation of the tire on the wheel to maintain the sealed passage, wherein the floating connection includes a convex surface and a complementary concave surface in mating contact with one another for supporting the head while allowing passive pivoting movement in at least first and second directions; and at least one reorientation member for resetting the head to a neutral angular orientation with respect to the fixed path of travel of the head between the first and second positions as the head returns to the first position from the second position.

16. The apparatus of claim 15, wherein the floating connection further comprises:

the convex and concave surfaces further allowing passive rotational movement of the head about the fixed path.

17. An apparatus for inflating a tire mounted on a wheel having first and second rims spaced from one another, the tire and wheel disposed at a predetermined position, the apparatus comprising:

a reciprocal inflation head moveable along a fixed path between a first position spaced from the wheel and tire, and a second position in operable engagement with a sidewall of the tire, the head having an annular sealing surface engageable with the sidewall of the tire to provide a sealed passage for introduction of compressed fluid between the tire and the wheel to inflate the tire on the wheel;

a floating connection allowing passive angular orientation of the head with respect to the sidewall of the tire as the head moves between the first and second positions to achieve sufficient contact between the sealing surface of the head and the sidewall of the tire for creation of the sealed passage and for maintaining sufficient contact during inflation of the tire on the wheel to maintain the sealed passage, wherein the floating connection includes at least partial spherical ball and complementary socket surfaces in mating contact with one another for supporting the head while allowing passive pivoting movement with at least two degree of freedom; and at least one reorientation member for resetting the head to a neutral angular orientation with respect to the fixed path of travel of the head between the first and second positions as the head returns to the first position from the second position.

18. The apparatus of claim 17, wherein the floating connection further comprises:

the ball and socket surfaces further allowing a third degree of freedom of movement corresponding to passive rotational movement of the head about the fixed path.

19. An apparatus for inflating a tire mounted on a wheel having first and second rims spaced from one another, the tire and wheel disposed at a predetermined position, the apparatus comprising:

a reciprocal inflation head moveable along a fixed path between a first position spaced from the wheel and tire, and a second position in operable engagement with a sidewall of the tire, the head having an annular sealing surface engageable with the sidewall of the tire to provide a sealed passage for introduction of compressed fluid between the tire and the wheel to inflate the tire on the wheel;

a floating connection allowing passive angular orientation of the head with respect to the sidewall of the tire as the head moves between the first and second positions to achieve sufficient contact between the sealing surface of the head and the sidewall of the tire for creation of the sealed passage and for maintaining sufficient contact during inflation of the tire on the wheel to maintain the sealed passage; and at least one reorientation member for resetting the head to a neutral angular orientation with respect to the fixed path of travel of the head between the first and second positions as the head returns to the first position from the second position, wherein the reorientation member includes at least one reorientation stop adjacent the first position for engaging the head as the head approaches the first position for returning the head to a neutral position with respect to the fixed path.

20. The apparatus of claim 19 wherein the reorientation member further comprises:

the neutral position generally perpendicular with respect to the fixed path.

21. An apparatus for inflating a tire mounted on a wheel having first and second rims spaced from one another, the tire and wheel disposed at a predetermined position, the apparatus comprising:

a reciprocal inflation head moveable along a fixed path between a first position spaced from the wheel and tire, and a second position in operable engagement with a sidewall of the tire, the head having an annular sealing surface engageable with the sidewall of the tire to provide a sealed passage for introduction of compressed fluid between the tire and the wheel to inflate the tire on the wheel;

a floating connection allowing passive angular orientation of the head with respect to the sidewall of the tire as the head moves between the first and second positions to achieve sufficient contact between the sealing surface of the head and the sidewall of the tire for creation of the sealed passage and for maintaining sufficient contact during inflation of the tire on the wheel to maintain the sealed passage; and at least one reorientation member for resetting the head to a neutral angular orientation with respect to the fixed path of travel of the head between the first and second positions as the head returns to the first position from the second position, wherein the at least one reorientation member includes a plurality of reorientation stops spaced angularly about the fixed path at equal angular positions with respect to one another for engaging the head as the head approaches the first position.

22. A method for inflating a tire mounted on a wheel having first and second rims spaced apart from one another, the tire and wheel disposed at a predetermined position, comprising the steps of:

moving reciprocal inflation head means along a fixed path between a first position spaced from the wheel and tire to be inflated, and a second position in operable engagement with a sidewall of the tire to be inflated, the head means having an annular sealing surface engageable with the sidewall of the tire to be inflated to provide a sealed passage for introducing compressed fluid between the tire and the wheel for inflating the tire on the wheel;

passively orientating the head means angularly with respect to the sidewall of the tire to be inflated with floating connection means as the head means moves between the first and second positions to achieve sufficient contact between the sealing surface of the head means and the sidewall of the tire to be inflated for creating the sealed passage and for maintaining sufficient contact during inflation of the tire on the wheel to maintain the sealed passage; and resetting the head means to a neutral angular orientation with respect to the fixed path of travel of the head means between the first and second positions with reorientation means as the head means returns to the first position from the second position.

23. The method of claim 22 further comprising the steps of:

positioning a deflated tire and wheel combination at the predetermined position on a step conveyor;

incrementally indexing the step conveyor to position a deflated tire and wheel combination at a work station in alignment with the fixed path of travel of the inflation head means;

engaging the sidewall of a deflated tire with the annular sealing surface of the inflation head means to define a sealed chamber as the inflation head means reciprocates between the first and second positions;

communicating pressurized fluid with the sealed chamber to inflate the tire on the wheel;

allowing passive angular reorientation of the inflation head means as the tire inflates on the wheel;

seating beads of the tire on the rims of the wheel;

returning the inflation head means to the first position; and indexing the step conveyor to remove the inflated tire and wheel combination from the work station and to simultaneously position another deflated tire and wheel combination at the work station.

* * * * *